May 7, 1929. J. K. McINTYRE 1,712,277
THRUST BEARING
Filed May 26, 1927
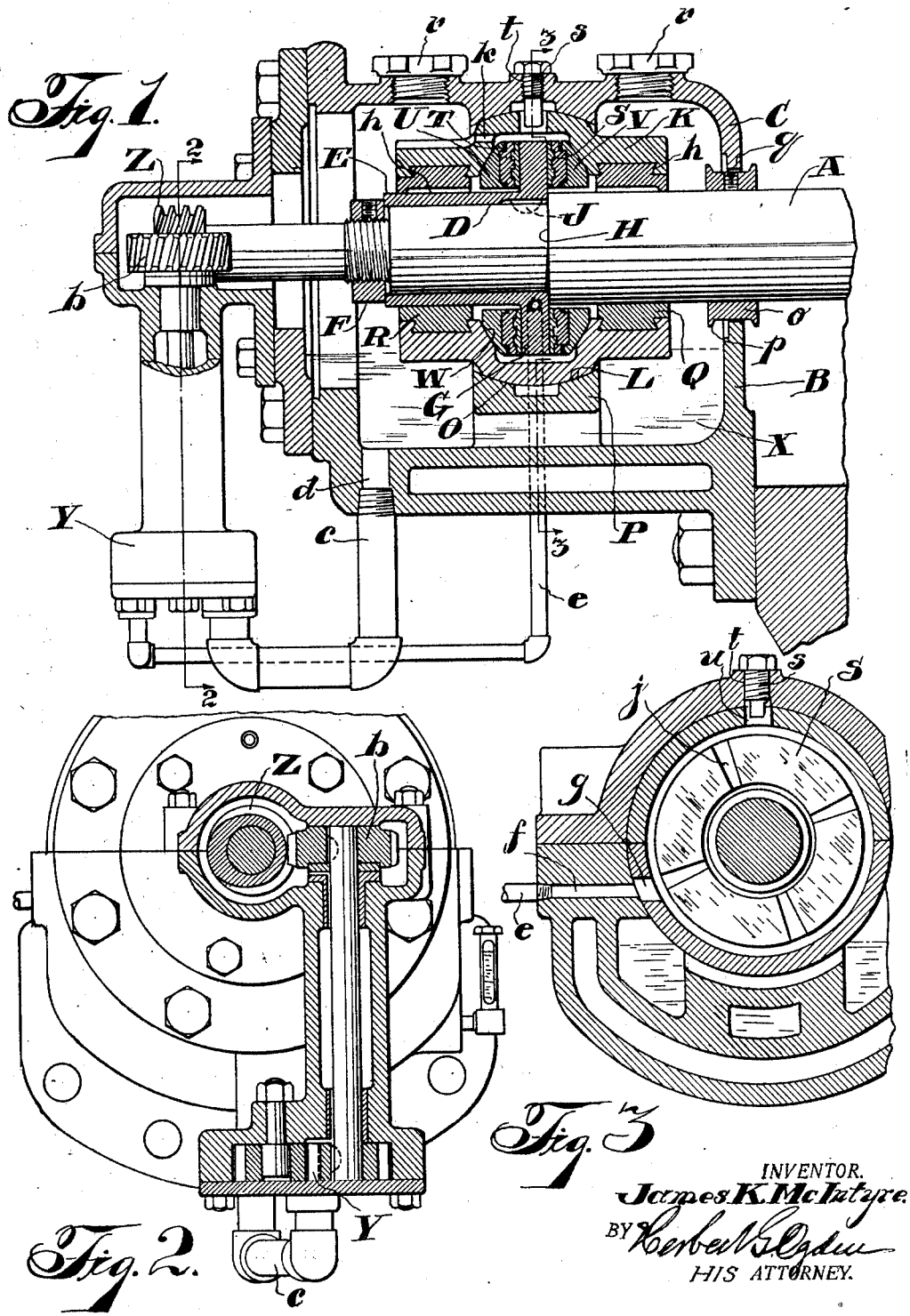
INVENTOR.
James K. McIntyre
BY Herbert S. Ogden
HIS ATTORNEY.

Patented May 7, 1929.

1,712,277

UNITED STATES PATENT OFFICE.

JAMES K. McINTYRE, OF EASTON, PENNSYLVANIA, ASSIGNOR TO INGERSOLL-RAND COMPANY, OF JERSEY CITY, NEW JERSEY, A CORPORATION OF NEW JERSEY.

THRUST BEARING.

Application filed May 26, 1927. Serial No. 194,380.

This invention relates to thrust bearings, and more particularly to thrust bearings for rotating shafts.

One of the objects of the invention is to provide adequate lubrication for a thrust bearing.

Shaft thrust bearings adapted to receive heavy loads are generally provided with a circulatory lubricating system by which the heat generated at the bearing is carried off with the oil and absorbed in suitable cooling apparatus through which the oil is passed. The usual construction provides an oil reservoir below the bearing and a pump for forcing the oil up into the bearing. A disadvantage of thrust bearings constructed in this manner has been that when the apparatus associated with the shaft is stopped, the oil drains from the bearing and consequently when the shaft starts to revolve the bearing starts dry. Great friction develops, especially since in many types of apparatus using such shafts, the greatest thrust occurs during the starting period. It has, therefore, been the experience that the greatest damage to the thrust bearing occurs during the starting period, that is, when the bearing faces are dry and under heavy load. It is, therefore, an object of this invention to construct a thrust bearing so that at least part of the bearing will be submerged at all times. This is accomplished by trapping a part of the oil within the bearing and at the bearing faces whereby some oil will be carried to all parts of the bearing without the help of the force feed.

Other objects and advantages of the invention will be in part obvious and in part pointed out hereinafter.

In the drawing forming part of the specification and in which similar reference characters refer to similar parts, Figure 1 is a longitudinal vertical section through a bearing constructed in accordance with the practice of the invention, Figure 2 is a vertical cross section through the pump, taken along the line 2—2 of Figure 1 looking in the direction of the arrows, and Figure 3 is a cross section taken along the line 3—3 of Figure 1 looking in the direction of the arrows.

The drawing shows a bearing suitable for a shaft A of a centrifugal pump or similar device, in which the maximum thrust occurs during the starting period. A housing comprising a lower half B and an upper half C is provided. The shaft A is formed with a reduced portion D upon which is fixed a sleeve E as by means of the nut F threaded onto the shaft. The sleeve E has a thrust flange G extending radially with respect to the shaft A and is adapted to bear against the shoulder H of the shaft. A suitable key J is provided for fixing the sleeve E onto the shaft and to prevent relative turning.

The bearing is provided with a support K having a spherical outer periphery L seating in a similarly shaped face O of a web P formed integrally with the housing portions B and C. Cylindrical journals Q and R are provided for the shaft A and are mounted in the bearing support K. The bearing support K also is provided with longitudinal thrust journals S and T suitably fixed in bearing rings U and V having spherical faces co-acting with spherical faces W in the bearing support K to permit self alignment of the journals S and T. The journals S and T are placed on opposite sides of the flange G to receive the thrust therefrom.

The housing B and C is hollow to provide space for a quantity of oil as indicated at X which is adapted to be pumped to the bearing surfaces of the shaft A and the thrust flange G. A suitable pump Y driven by spiral gears Z and $b$ associated with the shaft A is adapted to pump oil from the reservoir X through the suction pipe $c$ communicating with the reservoir X at a threaded aperture $d$ and to deliver through a pipe $e$, the lubricant to the bearing under pressure. To this end, the pipe $e$ is connected to the lower half B of the housing to a passageway $f$ leading through the casing through the spherical face O of the web P and through an aperture $g$ into the interior of the bearing support K (as shown in Figure 3).

During normal operation of the apparatus and while the shaft is rotating, it is intended that the interior of the bearing support K be flooded with oil supplied by the pump Y, the oil being arranged to enter the bearings Q and R through suitable oil grooves $h$ and into the journals S and T through oil grooves $j$. It is desirable that the oil be kept circulating in the bearing support K in order to prevent the oil from becoming overheated and to this end, the oil is permitted to overflow from an upper overflow passage $k$.

By this invention, the oil inlet $f$ into the bearing support K is located above the bottom of the thrust flange G so that some oil will always remain within the bearing support K. It will be noted that there is no outlet for the oil below the journals Q and R and therefore, the lubricant cannot be withdrawn below the level of the bottom of the shaft A. This insures that as the shaft A starts to rotate, there will be some lubricant on the bearings S and T and the friction developed cannot score those bearings.

To prevent oil from being splashed out of the housing formed by the lower and upper halves B and C respectively, the shaft A is provided with a ring o flanged as at p to throw the oil by centrifugal force back into the housing and to prevent such oil from passing through the shaft aperture q. Suitable filler caps r are provided in the upper half C of the housing through which the bearing may be inspected. The bearing support K is prevented from turning by means of a set screw s passing through a threaded aperture t in the upper half C of the housing and loosely engaging an aperture u in the bearing support K. The hole u is preferably larger than the end of the set screw t to permit slight movement of the bearing support K in aligning itself.

I claim:

1. A thrust bearing comprising a stationary housing, a self aligning bearing support in said housing, a thrust flange rotatable in said support, and relatively stationary thrust bearing rings for said flange supported by said bearing, said bearing rings also being self aligning with respect to said flange, said bearing support being provided with a chamber for lubricant having an inlet above the bottom of the flange and an upper overflow passage, whereby portions of said flange and said bearing rings are constantly immersed in lubricant.

2. A thrust bearing comprising a stationary housing, a self aligning bearing support in said housing, a thrust flange rotatable in said support, relatively stationary thrust bearing rings for said flange supported by said bearing, said bearing rings also being self aligning with respect to said flange, said bearing support being provided with a chamber for lubricant having an inlet above the bottom of the flange and an upper overflow passage, and means for circulating lubricant from the housing into said chamber.

3. A thrust bearing for a rotating shaft comprising a housing, a sleeve adapted to be fixed on said shaft and provided with a thrust flange, a self aligning bearing support mounted in said housing, cylindrical bearings for said shaft mounted in said support and adapted to receive the radial bearing load of said shaft, thrust bearing rings having spherical self aligning seats in said bearing support and cooperative with said flange to receive the thrust of said shaft, said support being provided with a chamber for lubricant about said bearing rings and flange, having an inlet above the bottom of said flange and an upper overflow passage, whereby portions of said bearing rings and flange are constantly immersed in lubricant, and means for forcing lubricant into said chamber and out through said outlet to provide lubricant circulation.

In testimony whereof I have signed this specification.

JAMES K. McINTYRE.